Feb. 12, 1952    G. H. CARLSON    2,585,225
PROCESS FOR HYDROLYZING LACTALBUMIN
Filed Aug. 23, 1947
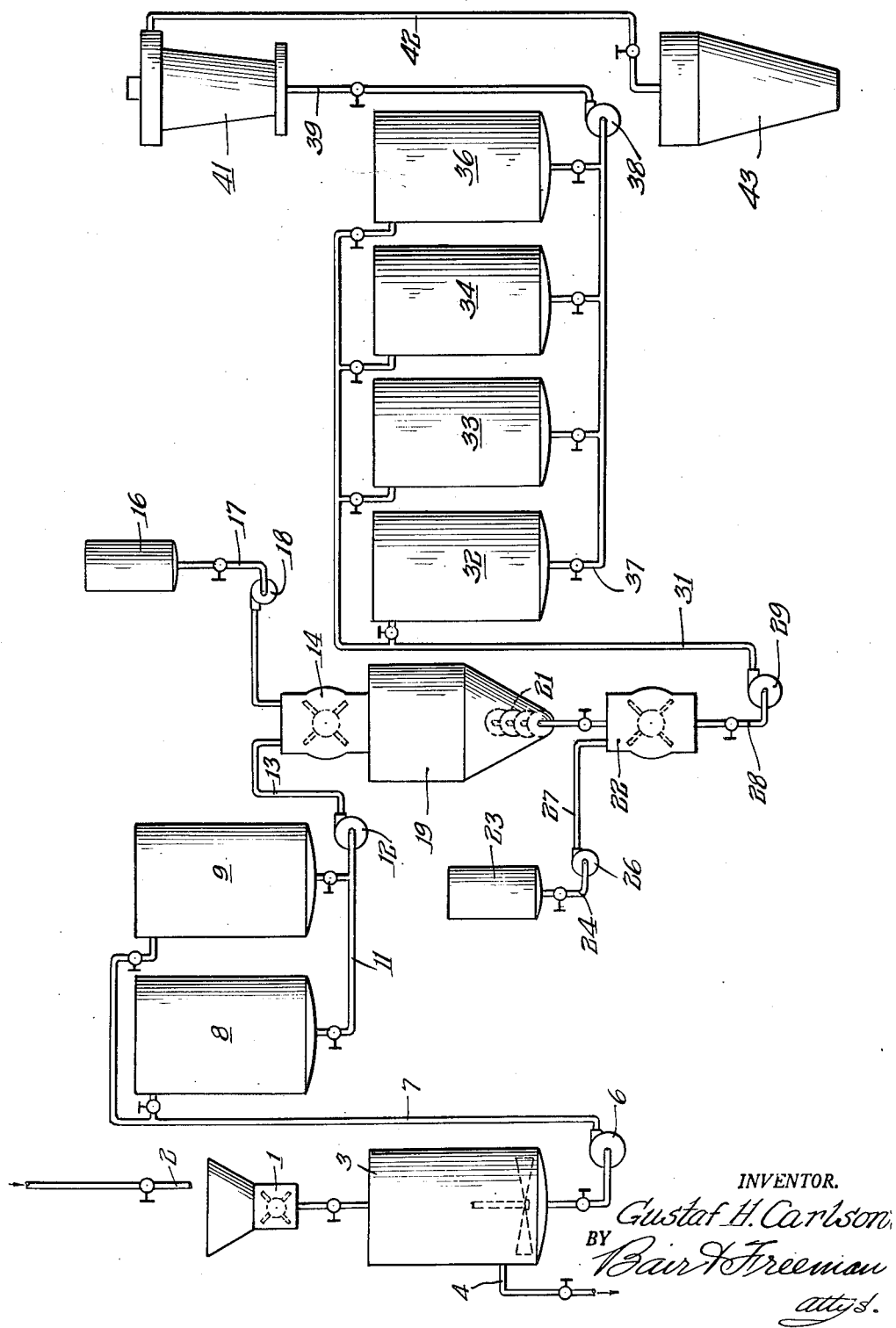
INVENTOR.
Gustaf H. Carlson
BY Bair & Freeman
attys.

UNITED STATES PATENT OFFICE 2,585,225

PROCESS FOR HYDROLYZING LACTALBUMIN

Gustaf H. Carlson, Detroit, Mich., assignor to R. P. Scherer Corporation, Detroit, Mich., a corporation of Michigan Application August 23, 1947, Serial No. 770,221

5 Claims. (Cl. 99—19)

This invention relates to the treatment of lactalbumin and is especially concerned with the production of novel and highly useful products of high nutrient value which are especially suitable for oral administration. Products made in accordance with the preferred embodiments of the present invention are characterized by excellent dispersibility, very low ash and sugar contents, and freedom from objectionable odor and taste.

The utilization of degradation or hydrolytic products of proteinaceous materials as foodstuffs or food supplements has long been suggested. Alkali degradation procedures, and acid degradation procedures, with or without the employment of elevated temperatures and pressures, as well as enzymic digestion procedures, in variant forms have been disclosed in a large number of patents and other publications. Such prior procedures have all been characterized by one or more objectionable features which have seriously militated against their commercial or more widespread commercial acceptance. Thus, for example, products produced pursuant to heretofore known processes possessed disadvantages such as inadequate solubility or dispersibility, destruction or undesirable alteration of valuable protein elements, poor keeping properties, and objectionable odor and flavor and, therefore, unpalatability. Hydrolysates, such as those disclosed, for example, in U. S. Patents Nos. 2,180,636 and 2,241,927 have also proved to be deficient in a number of respects, the administration thereof causing unexplained and, in many instances, undesirable clinical manifestations.

In accordance with the present invention, hereafter described in detail, hydrolytic products of lactalbumin may be prepared which represent marked improvements over products of the general type which have heretofore been known or suggested. These improvements manifest themselves in embodying, in a single product, readily assimilable material, excellent dispersibility, freedom from bacterial contamination, substantial absence of undesirable odors and flavors, good keeping properties, and excellent toleration by the individual without undesirable side effects or reactions. These results have been established by actual experience and are in contrast with results obtained with hitherto known commercially available protein hydrolysates. Products produced in accordance with the present invention are highly useful and advantageous in situations where normal feeding presents difficulties as, for example, in pre-operative and post-operative conditions, and in the case of persons afflicted with ulcers and the like. They also have a wide field of utility for child feeding and in the diet of convalescent patients.

In accordance with the present invention, it is possible to produce, on a large commercial scale, hydrolytic products of lactalbumin having the desirable attributes mentioned above in short periods of time and by continuous procedures. Indeed, in certain cases, it is because of such procedures that various of the important advantages of the invention result. While, however, the ability to operate the method as a continuous one is a highly important aspect of the present invention, the invention, in its broader aspects, is not so limited and it is within the scope of the present invention to practice the same as a batch process in which the novel teachings described hereafter are utilized.

In general, the invention involves treatment of lactalbumin, in the form of an aqueous suspension or, preferably, flowable slurry, with a non-toxic alkaline material, such as sodium hydroxide, and then with trypsin or similar enzymes derived from pancreas, the steps being carried out under certain controlled conditions, described in detail hereafter, whereby products of excellent flavor and taste and the other desirable properties previously mentioned are obtained. It is recognized that procedures for producing hydrolytic products of lactalbumin or other proteinaceous materials, with or without alkaline treatment, have heretofore been suggested. However, in certain instances, the procedures were concerned only with an investigation of the physical and chemical aspects of the reactions involved and were in no way concerned with the important practical and commercial aspects of providing products having not only desired nutritive and medicinal value but, in addition, taste and flavor or palatability which would be acceptable to the consumer. In no case have the factors which bring about the production of products having the desirable characteristics which result from the practice of the present invention been understood, appreciated or disclosed.

The invention will perhaps best be understood by giving initial consideration to the following illustrative examples wherein several embodiments of the invention are set forth but which are not to be construed as limitative of the full scope of the invention. Before describing the examples, however, it may be pointed out that, for best results, it is important that the lactalbumin employed be free or substantially free of casein, fat, lactose, and inorganic salts. The lactalbumin is conveniently prepared by acidifying defatted hot milk whey for precipitating the lactalbumin, washing the latter to remove water-soluble material and draining off most of the adhering water. It has been found that if the lactalbumin is frozen, the character of the lactalbumin appears to be modified so that, after thawing, it becomes particularly satisfactory for use in accordance with the present invention, the final hydrolytic products having the desired bland flavor which is one of the desiderata of the present invention, particularly where the products are prepared for oral administration. In general, the frozen lactalbumin as commercially prepared contains approximately 80% water.

*Example 1*

(a) Freshly prepared lactalbumin was suspended in warm water and, after the supernatant liquid had been siphoned from the settled mixture, the lactalbumin was pressed dry in a cloth. About 4 kg. of the resulting moist lactalbumin (containing about 25% solids by weight) was suspended in 7 liters of cold water, the mixture was agitated while being heated to 40 degrees C. and was then treated with a 10% sodium hydroxide solution until the alkalinity remained substantially constant. The sodium hydroxide solution addition to the lactalbumin suspension was made at intervals, a total of 225 cc. being added in four separate portions, first 25 cc., second 100 cc., third 75 cc., and fourth 25 cc. While the pH of the original lactalbumin suspension was 5.05, that of the final mixture was 9.4 and, at this latter value, during a period of one and one-half hours at 40 degrees C., the product gelatinized to a cheese-like consistency.

(b) A commercial trypsin was suspended in water in the ratio of 5 grams of the trypsin to 75 cc. of water. Said trypsin suspension was added to the gelatinized lactalbumin produced in part (a) hereof whereupon the pH dropped to 8. Thereupon, 65 cc. of 10% sodium hydroxide solution was added and the mixture was allowed to stand, at a temperature of 40 degrees C. for one-half hour, the pH value at the end of such time reading 8.15. Thereupon, 25 cc. more of 10% sodium hydroxide solution was added and again the mixture was allowed to stand for one-half hour at 40 degrees C. Again, 25 cc. of 10% sodium hydroxide solution was added and this time the mixture was allowed to stand for two and three-fourths hours at 40 degrees C. The final pH was 7.55, the product having the physical appearance and characteristics of milk except for a pale yellow coloration. Although the tryptic hydrolysis or digestion was allowed to proceed for a total of four hours, conversion was substantially completed at the end of two hours as shown by the analysis of test portions withdrawn from the reaction mixture at the end of two hours.

(c) The tryptic hydrolysate produced in part (b) hereof was immediately centrifuged and the clarified liquid effluent, having a pH of 7.6, was dried in vacuo to produce a pale yellow powder. The powder was readily reconstituted with water to yield a product having the general appearance and characteristics of milk and, like the powder, a bland flavor, clearly distinguishable from the bitter or disagreeable flavors and tastes of heretofore prepared hydrolysates.

*Example 2*

(a) Freshly prepared lactalbumin was suspended in warm water and, after the supernatant liquid had been siphoned from the settled mixture, the lactalbumin was pressed dry in a cloth. About 4 kg. of the resulting moist lactalbumin (containing about 25% solids by weight) was suspended in 7 liters of cold water, the mixture was agitated while being heated to 40 degrees C. and was then treated with a 10% sodium hydroxide solution until the alkalinity remained substantially constant. The sodium hydroxide solution addition to the lactalbumin suspension was made at intervals, a total of 290 cc. being added in six separate portions, first 100 cc., second 100 cc., third 25 cc., fourth 25 cc., fifth 20 cc., and sixth 20 cc. The pH of the original lactalbumin suspension was 4.9 and after all of the sodium hydroxide solution had been added the pH was 9.50. After the last addition of the sodium hydroxide solution, the mixture was allowed to stand for twenty minutes during which time the pH of the gelatinized product remained constant.

(b) To the product produced in part (a) of this Example 2, a trypsin suspension, such as described in part (b) of Example 1, was added, followed, after fifteen minutes, by 65 cc. of 10% sodium hydroxide solution and the mixture was then agitated for forty-five minutes at a temperature of 40 degrees C.

(c) The tryptic hydrolysate produced in part (b) hereof was neutralized with 135 cc. of 3.6% hydrochloric acid to a pH of 7.5 and immediately subjected to a centrifugal clarification. The bland milk-like effluent was evaporated in vacuo to produce a pale yellow powder having a good odor and pleasant flavor and which could be readily reconstituted with water. The presence of a small amount of sodium chloride (about 2.15%) in the product serves to enhance the reconstitution of the product with water and adds to the desirable flavor and palatability of the product.

*Example 3*

(a) Frozen lactalbumin (containing about 30% by weight of solids) which had been stored for six days at −80 degrees C. was thawed in hot water and then washed with hot water by decantation. The curdy residue was then suspended in 7 liters of water at 40 degrees C. and treated with 100 cc. of a 10% solution of sodium hydroxide. The pH of the original lactalbumin suspension was 5.6, it increased to 9.75 upon the addition of the sodium hydroxide solution, and at the end of ten minutes it dropped to 9.25.

(b) To the aforementioned gelatinized product of part (a) of this Example 3, a trypsin suspension, such as described in part (b) of Example 1, was added, followed, after fifteen minutes, with 25 cc. of 10% sodium hydroxide solution and, after another ten minutes, with a second 25 cc. portion of 10% sodium hydroxide solution. Digestion was then continued for forty-five minutes at 40 degrees C. and yielded a mixture of pH 7.55.

(c) The tryptic hydrolysate produced in part (b) hereof was immediately subjected to centrifugal clarification and the milk-like effluent dried in vacuo to produce a pale yellow powder which, upon reconstitution with water, resulted in a bland product having essentially the appearance and characteristics of milk.

*Example 4*

The method of this example may be carried out in a continuous manner utilizing the apparatus schematically shown in the accompanying drawing, said arrangement of apparatus having been found to be very advantageous for the operation of a continuous method.

2150 pounds of frozen lactalbumin (containing approximately 80% water) was ground in a suitable grinding device 1 and agitated with hot water, which was admitted to the grinding device through a suitable valved conduit 2, to produce a mixture of 1200 gallons at a temperature of approximately 41 degrees C. After the mixture was allowed to stand in wash tank 3 for about twenty minutes, approximately 900 gallons of aqueous extract was withdrawn through the side outlet 4 of the wash tank 3. About 60 gallons of hot water was then mixed with the residual extracted slurry in wash tank 3 and the resulting slurry was pumped by pump 6 through valved conduit 7 into duplicate holding tanks 8 and 9. After these tanks 8 and 9 were initially filled (tanks having a capacity of 400 gallons each are satisfactory), then the slurry was discharged from one of them, for example, tank 8, for further processing as described below. When tank 8 was empty, then it was filled with additional slurry from wash tank 3 while the slurry from tank 9 was being discharged for further processing. Duplicate holding tanks 8 and 9 are utilized in the manner described, being charged and discharged alternatively at a predetermined rate, to achieve continuity of operation in the subsequent processing. While two holding tanks are shown, it will be understood that, if desired, more may be employed.

360 gallons of the slurry, at a temperature of about 41 degrees C., was then fed through conduit 11 by the pump 12 at a rate of 12 gallons per minute through pipe 13 to the comminuting mill 14. There was simultaneously added to said slurry in mill 14, from storage tank 16 through pipe 17 through the medium of pump 18, a 4% solution of sodium hydroxide at a measured rate to produce a pH of 10.4 in the resulting mixture. The mixture was discharged into a processing tank 19 wherein the mixture was retained, by maintenance of the liquid mixture at a constant level, for about five minutes during which time gelatinization of the lactalbumin occurred. The resulting viscous, gelatinized lactalbumin was discharged from processing tank 19 and transferred therefrom by a conveyor screw 21 at a controlled rate to a second comminuting mill 22. From a container 23, a trypsin suspension of 500 g. of trypsin in 5 gallons of water at 40 degrees C. was fed at a controlled rate through pipe 24 by proportionation pump 26, discharging into mill 22 through pipe 27. The viscous mixture was discharged through conduit 28 by means of pump 29 and through conduit 31 successively into reaction tanks 32, 33, 34 and 36, a plurality of tanks being utilized to insure continuity of subsequent operations, and said tanks being filled at a rate to facilitate such continuity. The mixture was maintained in said tanks, with agitation and while holding the temperature at approximately 40 degrees C., for about one and one-half hours. The pH at the start of the hydrolysis reaction in tanks 32, 33, 34 and 36 was 10.2 and dropped gradually to 7.1 at the end of said one and one-half hour period.

The mobile liquid was then discharged through conduit 37 by pump 38 and through pipe 39 to a bank of centrifugal clarifiers 41 (only one is shown) at a rate of 18 gallons per minute. The effluent liquid, having a pH of 7.1, was then passed through conduit 42 to a spray drier 43. 840 pounds of a pale yellow powder, readily reconstituted with water, and having a bland flavor, was obtained.

It is particularly preferred that the alkaline materials employed be selected from the group consisting of sodium hydroxide and calcium hydroxide or mixtures thereof where products destined for oral administration are utilized as foodstuffs. The aforesaid alkaline materials are non-toxic and have been found to have no adverse effect upon the taste and flavor of the ultimate products. For use in or as foodstuffs or the like, it will, of course, be understood that non-toxic alkaline materials must be employed. Where toxicity considerations and taste and flavor factors are not so critical, it will be appreciated that alkaline materials generally, comprising alkali metal (including ammonium) and alkaline earth metal hydroxides, may be utilized. The term "non-toxic" is intended to denote alkaline materials which, under the conditions of use described herein, yield non-toxic products.

It is particularly preferred to treat the lactalbumin in the form of an aqueous slurry with the sodium hydroxide or other alkaline material. In certain cases, such slurries may contain other materials as, for example, alcohol. However, in such event, the alcohol content must be maintained below such values as will inhibit the activity of the trypsin. As a general rule, apart from minimizing the possibility of bacterial contamination, which, however, is ordinarily not encountered because of the rapidity with which the process is carried out, the use of alcohol or allied materials offers no particular advantages and it is, therefore, generally most desirable that the aqueous slurries contain no supplemental materials.

For large scale operations, and where the nature of the available equipment permits, it is particularly preferred that the alkaline material be added continuously to a flowing slurry of the lactalbumin with a predetermined scheduled time period, for example, five minutes, being allowed for reaction of the alkaline material with the lactalbumin prior to the treatment with the trypsin. This procedure not only permits the processing of large quantities of lactalbumin in continuous operations but also tends to insure the production of products of substantially bland flavor. The addition of the alkaline material may, however, be intermittent or stepwise or, if the nature of the equipment available for processing permits, the alkaline material may be added substantially all at once. The intermittent or stepwise addition of the alkaline material, generally speaking, requires careful control in order to avoid degradation of the lactalbumin to products having an off-flavor. The addition all at once of the predetermined amount of alkaline material employed necessitates, generally speaking, large containers for the gelatinized lactalbumin and sturdily constructed stirring mechanisms for agitation of the viscous gels which result from alkalinization of fresh lactalbumin. While, therefore, within the broad aspects of the invention, the addition of the alkaline material may be accomplished in various ways, it is especially desirable to accomplish the same in the particularly preferred manner described above.

The amount of alkaline material added to the lactalbumin is such, particularly where a continuous process is employed, that the initial pH of the lactalbumin-alkaline material mixture is not in excess of 11 and may range as low as 7.5.

If the initial pH is adjusted to about 10.5, which is the particularly preferred practice, and then, after the gelatinization period, the trypsin is added and the resulting hydrolysis allowed to take place over a period of about one and one-half to two hours, bland and substantially neutral (pH 7.0 to 7.5) products are obtained in which the ash content is at a minimum. In general, the amount of alkaline material added to the lactalbumin is such that, after a tryptic hydrolysis step of about one and one-half to two hours, the final product obtained has a pH of 7.0 to 7.5. By so proceeding, products of excellent blandness of flavor and low ash content are insured.

If an amount of alkaline material is added to the lactalbumin to produce a gelatinized mixture having a pH of, say, 8, and the trypsin is then added, the viscous gelatinized product is rapidly solubilized but the pH falls rapidly to 7 or even less with the result that the tryptic action diminishes substantially. The tryptic activity may be restored by the stepwise addition of gradually diminishing increments of alkaline material so as to maintain a pH such that, although decreasing gradually, it reaches a value of about 7 to 7.5 after the tryptic hydrolysis has been carried out for about one and one-half to two hours. This type of procedure, while within the broader phases of the present invention, is difficult to control and, therefore, does not comprise the particularly preferred embodiment of this aspect of the invention.

The length of time that the alkaline material is allowed to remain in contact with the lactalbumin prior to the addition of the trypsin is somewhat variable, depending, in part, upon the character of the lactalbumin. Thus, for example, old lactalbumin is gelatinized or denaturated only sluggishly by alkali and, in such cases, the reaction period may extend for up to an hour or more prior to the addition of the trypsin. With freshly prepared lactalbumin, with which it is particularly preferred to work pursuant to the present invention, good results are obtained by allowing the reaction with the alkaline material to proceed for from three to twenty minutes. With a proper mechanical equipment set-up for large scale continuous operations, in which pump and feed mechanisms are designed and incorporated to provide a certain schedule of operations, excellent results are obtained utilizing a reaction period of three to five minutes.

While the gelatinization of the lactalbumin with the alkaline material may be effected at various temperatures, for economy of operations the lactalbumin slurry is prepared at a temperature of about 38 degrees C.–44 degrees C., preferably about 40 degrees C., encompassing the range at which the subsequent treatment with trypsin is most desirably carried out. In this connection, it may be pointed out that the action with the trypsin is most suitably effected at 40 degrees C.–44 degrees C., preferably at about 41 degrees C.–42 degrees C.

It is particularly desirable to utilize a trypsin product which is substantially free of fat and lipolytic activity and which has high proteolytic activity. The freedom from fat or lipolytic activity insures against the presence of fat cleavage products which possess or shortly assume objectionable rancid-like flavors. The high proteolytic activity of the trypsin serves to bring about rapid hydrolysis of the gelatinized lactalbumin so that solubilization is achieved before any substantial portion of the lactalbumin becomes degraded to products of bitter, undesirable flavor. As illustrative of trypsin preparations with which excellent results are obtained, reference is made to a trypsin product having a potency rating of 1:250, as determined by currently accepted assay methods. With such a trypsin preparation, one pound thereof is effective for the treatment of 500 to 600 pounds of lactalbumin where the hydrolysis treatment is completed in from one and one-half to two hours. With trypsin preparations having lower potency ratings, greater amounts thereof are necessary to effect the desired hydrolysis. As previously indicated, the tryptic hydrolysis is carried out at a temperature within the range of 38 degrees C.–44 degrees C. and particularly at 40 degrees C.–42 degrees C. The maximum length of time that the tryptic hydrolysis should be allowed to proceed is about six hours since, thereafter, bitter products appear in the hydrolysate. It is particularly preferred, however, that the tryptic hydrolysis reaction be limited to from about one and one-half to two hours. Then the resulting hydrolysate will be characterized by an alpha amino nitrogen content ranging from about 14 to about 19% of the total nitrogen content. The alpha amino content may be determined by the Van Slyke method or, more conveniently, by a modification of the formol titration method developed by Sorenson (Biochemische Leitschrift, volume 7, page 45, 1907; and Schmidt, "Chemistry of the Amino Acids and Proteins," 1938, pages 190–194). The modified formol titration involves preliminary adjustment of a suspension of hydrolysate in distilled water to pH 5.8, as with dilute hydrochloric acid, addition of formaldehyde, and electrometric titration with dilute sodium hydroxide to a pH of 9.1.

It is particularly preferred to utilize trypsin as the proteolytic enzyme in accordance with the present invention, it being understood, of course, that the term "trypsin" is intended to include within its scope commercial preparations containing trypsin and exhibiting substantial tryptic activity. Proteolytic enzymes derived from pancreas generally may be employed which, for convenience, may be referred to as pancreatic enzymes. Other proteolytic enzymes, such as papain, erepsin and the like, have limited usage but require specially controlled conditions and produce hydrolysates of somewhat less satisfactory character than those obtained through the use of pancreatic enzymes and, more particularly, trypsin. All such enzyme products should, as indicated above, be free or substantially free of fat or lipolytic activity.

After the tryptic hydrolysis has been carried out for the desired period of time, preferably one and one-half to two hours, as previously stated, the enzymic action is stopped by rapid heating or pasteurization of the hydrolysate. Where a dried product is desired, it is advantageous to carry out the drying step, which most desirably is a spray drying procedure, as rapidly as possible to avoid coagulation and discoloration which frequently occur if the hydrolysate is stored for prolonged periods of time at elevated temperatures. While the clarified hydrolysate may be maintained at a temperature of the order of 85 degrees C. for an hour or more and subsequently spray dried to produce a satisfactory product, it is preferred for the reasons noted above, as well as for reasons of economy, that the time period between the pasteurization and the subjection of the hydrolysate to the drying operation does not exceed fifteen to twenty minutes.

While the invention has been described in detail, it is to be understood that the scope thereof is not to be limited other than is set forth in the claims.

What is claimed as new and desired to be protected by Letters Patent of the United States is:

1. A method for preparing a product of high nutrient value, characterized by substantial freedom from objectionable odor and taste, which comprises admixing an aqueous slurry of lactalbumin with a non-toxic alkaline material and maintaining the mixture at a temperature in the range of 35 degrees C. to 50 degrees C., the pH of said mixture being controlled so that it falls within the range of 7.5 to 11.0, whereby said solution undergoes gelatinization, adding a proteolytic pancreatic enzyme free from lipolytic activity to said gelatinized mass and holding the resulting mixture at a temperature falling within the range of 38 degrees C. to 44 degrees C. for a period not exceeding about two hours, while maintaining the pH of said mixture at at least 7.0 to form a hydrolyzed lactalbumin having not more than about 19% of its total nitrogen content in the form of alpha amino nitrogen clarifying said reaction mixture to recover the liquid effluent, and then drying the same.

2. A method of preparing a product of high nutrient value, suitable for oral administration and characterized by substantial freedom from objectionable odor and taste, which comprises grinding frozen lactalbumin and agitating the same with hot water to form a thin slurry, partially dewatering the same to leave a flowable slurry, maintaining said slurry at a temperature within the range of about 35 degrees C. and about 50 degrees C. while gradually adding thereto a non-toxic alkaline material to produce a pH within the range of 7.5 to 10.5 and holding the mixture until gelatinization occurs, adding a proteolytic pancreatic enzyme free from lipolytic activity to said gelatinized mass and allowing the resulting mixture to stand at a temperature within the range of 40 degrees C. to 42 degrees C. for a period not exceeding about two hours to form a hydrolyzed lactalbumin having not more than about 19% of its total nitrogen content in the form of alpha amino nitrogen, centrifugally clarifying said reaction mixture, and then drying the resulting liquid effluent.

3. A method for preparing a product of high nutrient value, suitable for oral administration and characterized by substantial freedom from objectionable odor and taste, which comprises admixing an aqueous slurry of lactalbumin with an aqueous solution of sodium hydroxide, maintaining the mixture at a temperature of about 40-44 degrees C., over a period within the range of several minutes to not in excess of two hours, the pH of said mixture being controlled so that it falls within the range of about 9 to about 10.5, whereby said solution undergoes gelatinization, and adding a proteolytic pancreatic enzyme free from lipolytic activity to said gelatinized mass and holding the resulting mixture at a temperature of about 40-44 degrees C. for a period not exceeding about two hours and until the pH drops to within the range of 7 to about 7.5 to form a hydrolyzed lactalbumin having not more than about 19% of its total nitrogen content in the form of alpha amino nitrogen.

4. A method of preparing a product of high nutrient value, suitable for oral administration and characterized by substantial freedom from objectionable odor and taste, which comprises admixing a flowable aqueous slurry of lactalbumin with a non-toxic alkaline material to produce a mixture having a pH of from 9 to 10.5, maintaining said slurry at a temperature within the range of 38 degrees C. and 44 degrees C. until gelatinization occurs but not in excess of about two hours, adding a proteolytic pancreatic enzyme free from lipolytic activity to said gelatinized mass and holding the resulting mixture at a temperature within the range of 38 degrees C. to 44 degrees C. for a period not exceeding about two hours to form a hydrolyzed lactalbumin having not more than about 19% of its total nitrogen content in the form of alpha amino nitrogen.

5. A method of preparing a product of high nutrient value, suitable for oral administration and characterized by substantial freedom from objectionable odor and taste, which comprises grinding frozen lactalbumin and agitating the same with hot water to form a thin slurry, partially dewatering the same to leave a flowable slurry, maintaining said slurry at a temperature within the range of 38 degrees C. and 44 degrees C. while adding thereto a non-toxic alkaline material to produce a pH within the range of 9 to 10.5 and holding the mixture until gelatinization occurs but not in excess of about two hours, adding a proteolytic pancreatic enzyme free from lipolytic activity to said gelatinized mass and holding the resulting mixture at a temperature within the range of 38 degrees C. to 44 degrees C. for a period not exceeding about two hours to form a hydrolyzed lactalbumin having not more than about 19% of its total nitrogen content in the form of alpha amino nitrogen, centrifugally clarifying said reaction mixture, and then drying the resulting liquid effluent.

GUSTAF H. CARLSON.

REFERENCES CITED

The following references are of record in the file of this patent:

UNITED STATES PATENTS

| Number | Name | Date |
|---|---|---|
| 750,832 | Dunham | Feb. 2, 1904 |
| 1,731,702 | Black | Oct. 15, 1926 |
| 2,284,435 | Lowe et al. | May 26, 1942 |
| 2,489,880 | Hand et al. | Nov. 29, 1949 |